United States Patent
Morfino

(10) Patent No.: US 8,565,611 B2
(45) Date of Patent: Oct. 22, 2013

(54) OPTICALLY-CONNECTED SYSTEM FOR EXCHANGING DATA AMONG INDUSTRIAL AUTOMATION DEVICES

(75) Inventor: Giuseppe Morfino, Pino Torinese (IT)

(73) Assignee: Fidia S.p.A., San Mauro Torinese (IT)

(*) Notice: Subject to any disclaimer, the term of this patent is extended or adjusted under 35 U.S.C. 154(b) by 0 days.

(21) Appl. No.: 13/542,585

(22) Filed: Jul. 5, 2012

(65) Prior Publication Data
US 2012/0269518 A1    Oct. 25, 2012

Related U.S. Application Data

(63) Continuation of application No. 12/355,669, filed on Jan. 16, 2009, now abandoned, which is a continuation-in-part of application No. 10/432,125, filed as application No. PCT/IT02/00423 on Jun. 26, 2002, now abandoned.

(51) Int. Cl.
*H04B 10/00* (2013.01)

(52) U.S. Cl.
USPC ............................ 398/164; 398/129; 398/130

(58) Field of Classification Search
USPC .................................................. 398/118–131
See application file for complete search history.

(56) References Cited

U.S. PATENT DOCUMENTS

| | | | | |
|---|---|---|---|---|
| 4,063,083 A | * | 12/1977 | Cathey et al. | 398/164 |
| 4,850,044 A | * | 7/1989 | Block et al. | 398/118 |
| 5,023,463 A | * | 6/1991 | Boardman et al. | 250/551 |
| 5,204,866 A | * | 4/1993 | Block et al. | 372/27 |
| 5,245,680 A | * | 9/1993 | Sauter | 385/24 |
| 5,280,184 A | * | 1/1994 | Jokerst et al. | 257/82 |
| 5,495,357 A | * | 2/1996 | Osterhout | 398/107 |
| 5,726,788 A | * | 3/1998 | Fee et al. | 398/180 |
| 5,818,618 A | * | 10/1998 | Eastmond | 398/164 |
| 5,818,619 A | * | 10/1998 | Medved et al. | 398/128 |
| 5,850,189 A | * | 12/1998 | Sakanaka et al. | 340/12.22 |
| 6,038,048 A | * | 3/2000 | Harris et al. | 398/156 |

(Continued)

FOREIGN PATENT DOCUMENTS

| | | |
|---|---|---|
| EP | 1402662 B1 | 10/2004 |
| IT | WO2004004169 A1 | 1/2004 |
| JP | 314831 A | 11/1996 |
| WO | WO0178265 A1 | 10/2001 |

OTHER PUBLICATIONS

Fidia S.P.A., International Search Report issued in related International Patent Application No. PCT/IT02/00423 on Mar. 21, 2003.

(Continued)

*Primary Examiner* — Agustin Bello
(74) *Attorney, Agent, or Firm* — David A. Farah; Sheldon Mak & Anderson PC

(57) ABSTRACT

An optically-connected system is disclosed for exchanging data among industrial automation devices, that is composed of a plurality of connection modules, where each module comprises at least two pairs of optical transmitters and receivers on the main side, and one optical receiver on the opposing main side, that are opposite with respect to another pair of transmitters and receivers in a following module; and where each one of the transmitters and receivers is adapted to communicate with industrial automation devices to cooperate for exchanging data between modules, sending one interrogation signal requesting an identity of the module and the receiver is adapted to send to each corresponding response signal containing characteristics of the receiver.

1 Claim, 3 Drawing Sheets

(56) References Cited

U.S. PATENT DOCUMENTS

| | | | |
|---|---|---|---|
| 6,038,355 A * | 3/2000 | Bishop | 385/14 |
| 6,160,653 A * | 12/2000 | Davidson | 398/164 |
| 6,310,992 B1 * | 10/2001 | Gehrke et al. | 385/24 |
| 6,480,313 B1 * | 11/2002 | Kawamura | 398/173 |
| 6,628,441 B1 * | 9/2003 | Staiger | 398/164 |
| 6,636,920 B1 | 10/2003 | Larson | 710/305 |
| 6,640,273 B1 * | 10/2003 | Spisak et al. | 710/104 |
| 6,650,844 B1 * | 11/2003 | Davies et al. | 398/164 |
| 7,010,233 B2 * | 3/2006 | Lindblad | 398/164 |
| 7,039,265 B2 * | 5/2006 | Levy et al. | 385/14 |
| 7,079,778 B1 * | 7/2006 | Nelson et al. | 398/164 |
| 7,110,679 B2 * | 9/2006 | Byers et al. | 398/164 |
| 7,162,158 B2 * | 1/2007 | Byers et al. | 398/128 |
| 8,466,405 B2 * | 6/2013 | Bach | 250/214 R |
| 2002/0176441 A1 * | 11/2002 | Swales et al. | 370/465 |
| 2009/0175625 A1 * | 7/2009 | Morfino | 398/128 |

OTHER PUBLICATIONS

International Business Machines Corp., Patent Abstracts of Japan, vol. 1998, No. 7, Mar. 31, 1998, 1 page abstract.

Morfino, G., Office Action dated Jan. 11, 2007 issued in related U.S. Appl. No. 10/432,125.

Morfino, G., Office Action dated Jun. 19, 2007 issued in related U.S. Appl. No. 10/432,125.

Morfino, G., Office Action dated Jan. 9, 2008 issued in related U.S. Appl. No. 10/432,125.

Morfino, G., Office Action dated Oct. 16, 2008 issued in related U.S. Appl. No. 10/432,125.

Morfino, G., Office Action dated Sep. 6, 2006 issued in related U.S. Appl. No. 10/432,125.

Morfino, G., Office Action dated Sep. 21, 2011 issued in related U.S. Appl. No. 12/355,669.

Morfino, G., Office Action dated Jan. 6, 2012 issued in related U.S. Appl. No. 12/355,669.

* cited by examiner

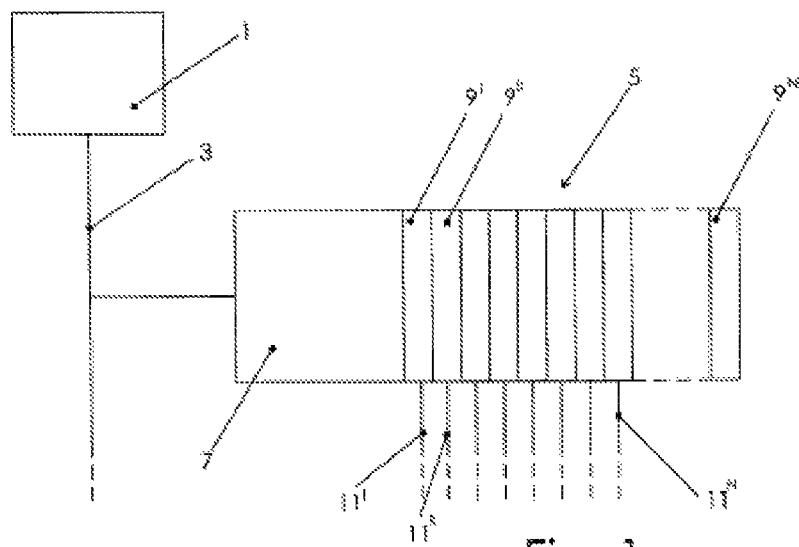
Fig. 1
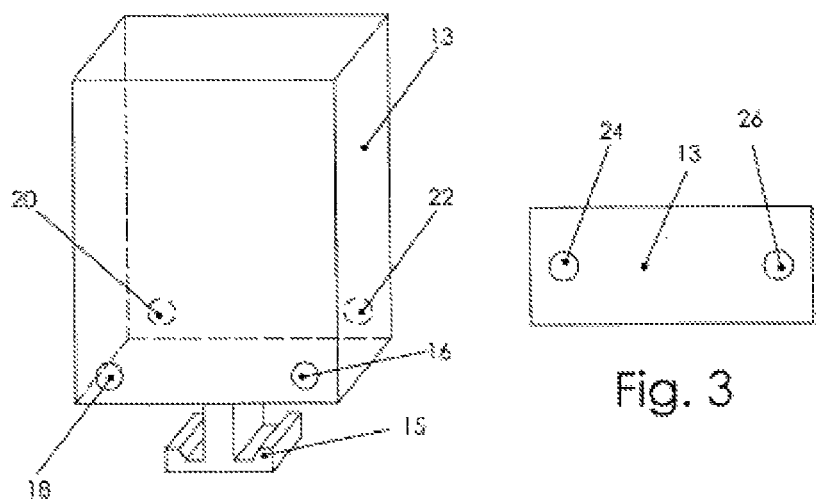
Fig. 2
Fig. 3

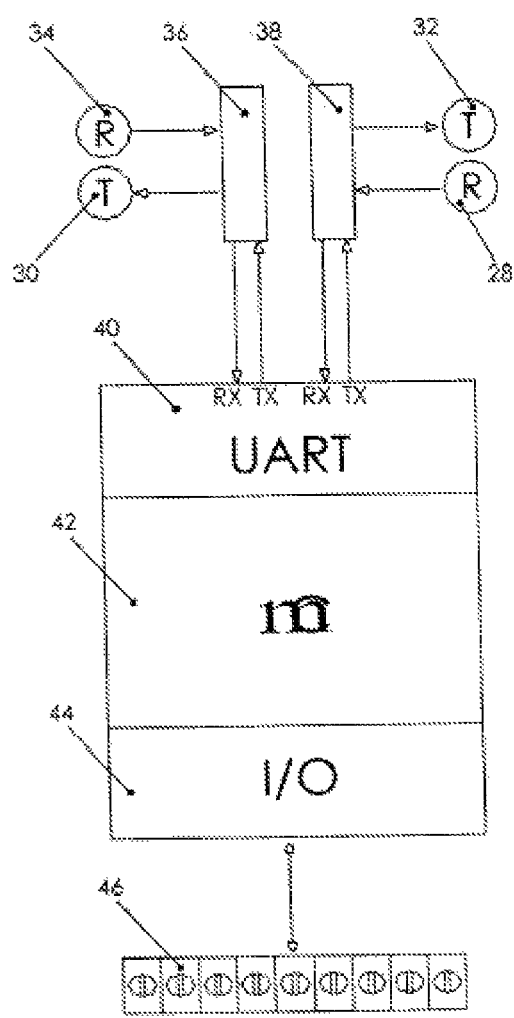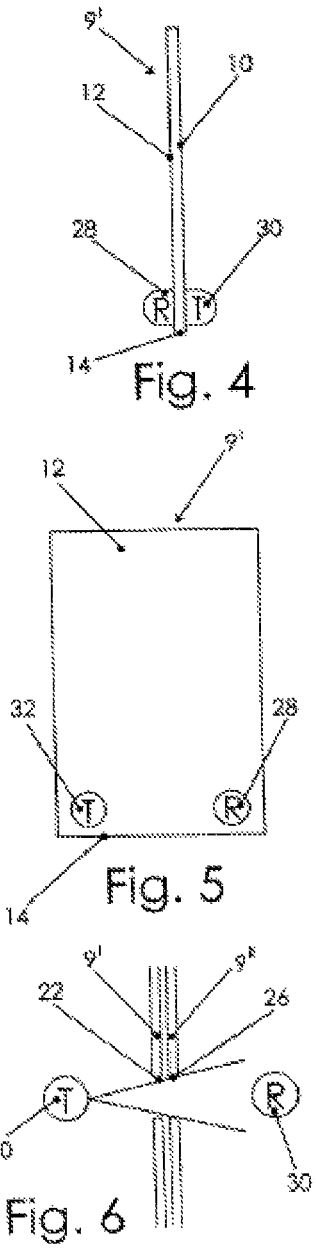
Fig. 4
Fig. 5
Fig. 6
Fig. 7

ND AMONG INDUSTRIAL
OPTICALLY-CONNECTED SYSTEM FOR EXCHANGING DATA AMONG INDUSTRIAL AUTOMATION DEVICES

CROSS-REFERENCE TO RELATED APPLICATIONS

This application is a continuation of U.S. patent application Ser. No. 12/355,669 titled "Optically-Connected System for Exchanging Data Among Industrial Automation Devices," filed Jan. 16, 2009, which is a continuation-in-part of U.S. patent application Ser. No. 10/432,125 titled "Optical Connection System," filed Feb. 4, 2004, now abandoned, which claims priority from International Patent Application No. PCT/IT02/00423 titled "Optically-Connected System for Exchanging Data Among Industrial Automation Devices," filed Jun. 26, 2002, the contents of which are incorporated by reference herein in their entirety.

BACKGROUND

The present invention refers to an optically-connected system, in particular through optical rays with infrared frequency, for exchanging data among industrial automation devices.

Currently, in industrial automation applications, it is common to realize a plurality of connection elements (that contain input and output lines towards external devices such as sensors, etc.) placed one beside the other (for example on a DIN-type bar) and mutually connected and connected to a data collecting and ordering element (commonly known as "power terminal"), which, in turn, through a field bus, sends data, collected from different external devices, to an upstream numeric control. In order to realize the data exchange between connection elements and data collecting and ordering element, a serial connection is commonly provided that allows both the passage of different data, and the supply of various elements. The connection and data collecting and ordering elements are each contained inside a respective box, having various shapes and sizes, adapted to be assembled on bars or operatively installed in another way.

A system built in this way has many problems: first of all, when one of the connection elements fails, in some cases it is necessary to disassemble the whole row of elements, since such element cannot be individually removed; in other cases, if it is possible to remove the element shaped as a card from the box that contains it, its removal stops the serial connection line and therefore, if one has not a connection element to immediately replace it, such line is interrupted and then deactivated, with obvious disadvantages.

Moreover, the boxes containing the various elements are very often of a complicated configuration and therefore are of a very high cost for stamping them. Where the boxes are simpler as configuration, they are lacking many functionalities that current automations require.

Other problems of the above system are the presence of "physical" contacts that the various elements have in order to be mutually connected: such contacts are subjected to wear, dirt and other environmental conditions, such as for example electromagnetic disturbances, that damage their functionality, in turn damaging the other system connection elements.

Still more, the supply that it is possible to provide through the serial connection is relatively limited, allowing to mutually connect a maximum number of elements that is equal to 8 or 16 digital outputs each one at 250 mA. If the necessary connection elements are greater than this number, it is necessary to provide for a further system, serially connected to the previous one, with obvious problems of cost and connections.

Object of the present invention is solving the above prior-art problems by providing an optically-connected system that is simple to be realized, install, use and subject to maintenance, is of a reduced cost from the points of view both of manufacturing, and of use, and above all is much more efficient and reliable with respect to connections currently present on the market.

Another object of the present invention is providing an optically-connected system that allows quickly replacing faulty or unusable elements, that can moreover do without some elements in the series without anyway compromising the data exchange capability among the elements being present, and that is insensitive to electromagnetic disturbances on the lines, that are a frequent cause of errors in current connections. With an arrangement of this type, it is possible to group the various elements composing the series by families of use, simplifying and increasing the safety for maintenance people involved.

A further object of the present invention is providing an optically-connected system as mentioned above that is scarcely sensitive to influences from the surrounding environment, such as for example dirt, noises, vibrations, etc.

The above and other objects and advantages of the invention, as will appear from the following description, are obtained by an optically-connected system as claimed in claims 1 and 2. Preferred embodiments and non-trivial variations of the present invention are claimed in the dependent claims.

The present invention will be better described by some preferred embodiments thereof, given as a non-limiting example, with reference to the enclosed drawings, in which:

FIG. 1 is a schematic block view of a configuration of industrial automation elements to which the optically-connected system of the present invention can be applied;

FIG. 2 is a schematic perspective view of an industrial automation box that can be used with the present invention;

FIG. 3 is a bottom view of the box in FIG. 2;

FIG. 4 is a schematic side view of a plate that points out the optically-connected system of the invention applied thereto;

FIG. 5 is a front view of the plate in FIG. 4;

FIG. 6 is a schematic operating view of the optically-connected system of the invention;

FIG. 7 is a schematic block diagram of the main components necessary for implementing the optically-connected system of the present invention.

SUMMARY

Figure 8:
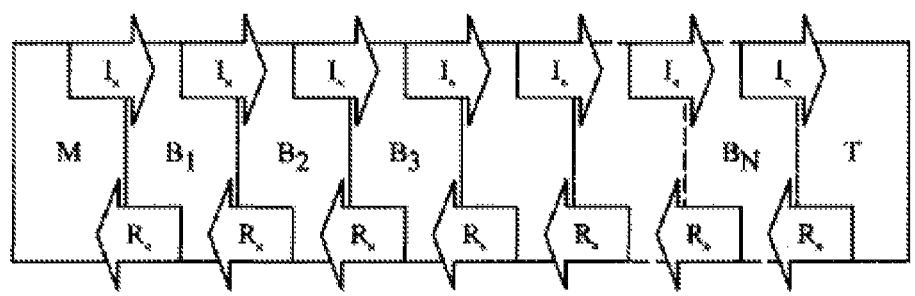
FIG. 8 is a schematic block diagram of a series of I/O modules.

In one embodiment, there is presented an optically-connected system for exchanging data among industrial automation devices, the system comprising a plurality of connection modules; where each connection element has a main side and an opposing main side, and, perpendicular to the main sides, a minor side and an opposing minor side; where each one of the connection modules comprises at least two pairs of optical transmitters and receivers; where each pair of the optical transmitters and receivers comprises one optical transmitter on the main side of each one of the connection modules, and one optical receiver on the opposing main side of each one of the connection modules; where each pair of the optical transmitters and receivers is further placed on the main side of the connection modules in an opposite way with respect to another pair of the transmitters and receivers in a following connection element, in such a way as to place on each main side of the connection modules one transmitter followed by one receiver eventually followed by one transmitter; where each one of the transmitters and receivers is adapted to communicate with industrial automation devices; where each one of the transmitters and receivers is adapted to cooperate for exchanging data with a respective receiver and transmitter of another adjacent of the connection modules; where each one of the transmitters is adapted to send to each corresponding one of the receivers one interrogation signal requesting an identity of the receiver, and each one of the receivers is adapted to send to each corresponding requesting transmitter a Response signal containing characteristics of the receiver, the Response signal identifying each receiver as a receiver that passes information from a first one of the transmitters to a last one of the receivers, the Response signal of the last one of the receivers containing information identifying the last one of the receivers as an end receiver of the system; and where an optical beam transmitted through the system is a combination of a beam transmitted by each connection module and a beam received by a following connection module.

In another embodiment, the optically-connected system comprises at least one connection module that is equipped on one of its minor sides with at least one additional pair of transmitters and receivers.

In one embodiment, the optically-connected system comprises connection modules that are placed inside a box for industrial automation, each one of the boxes being equipped with holes next to the transmitters and receivers in order to allow their mutual operability. Optionally, the connection modules are placed inside a box for industrial automation, each one of the boxes being equipped with holes obtained next to the transmitters and receivers in order to allow their mutual operability and with holes obtained next to the at least one additional pair of transmitters and receivers in order to allow their operability.

In one embodiment, the optical transmitters and receivers transmit and receive infrared rays, laser rays, microwave rays, or rays in the visible spectrum. Optionally, the transmitters and receivers operate according to the IrDa protocol or is connected to a respective encoder/decoder, that is in turn connected to a control and management device; and the control and management device is connected, through an I/O interface, to a terminal board for supply and signal input/output from one or more than one external industrial automation device. In another embodiment, each path of the transmitters and receivers is connected to a respective encoder/decoder, that is in turn connected to a control and management device; and the control and management device is connected, through an I/O interface, to a terminal board for supply and signal input/output from one or more than one external industrial automation device. In another embodiment, the control and management device is composed of a UART-type element and a microprocessor. In another embodiment, the control and management device is composed of a UART-type element and a microprocessor.

In one embodiment, the optically-connected system further comprises a supply to each one of the connection modules that is separate from the optically-connected system. The supply can be provided by serial connections through small cables or detachable connection terminal boards.

In one embodiment, the connection modules further comprise a plurality of data input and output elements respectively connected to industrial automation devices and a data collecting and queuing element operatively connected to the data input and output elements, the element being connected, through a field bus, to a numeric control for managing data.

In one embodiment, there is provided a method for exchanging data among industrial automation devices comprising: a) providing a system according to claim 1; and b) starting transmission and reception of data among the industrial automation devices; where each of the industrial automation devices is connected to one of the connection modules.

DETAILED DESCRIPTION

With reference to the Figures, non-limiting examples of embodiments of the optically-connected system of the present invention are shown. The device will be described hereinbelow by applying it to the field of industrial automation in general, but it is evident that it can find a valid and efficient application to any field in which it is necessary to perform an efficient data exchange between mutually connectable devices that are preferably adjacent and use a supply and data exchange bus.

A first preferred embodiment of the present invention (shown in the drawings only in a general form) provides for an optically-connected system for exchanging data among industrial automation devices, composed of a plurality of connection elements $7, 9', 9'', \ldots, 9^N$. Each one of such connection elements $7, 9', 9'', \ldots, 9^N$ is equipped with one pair of optical transmitting 30, 32 and receiving 28, 34 means: such pair is composed of one optical transmitting means 30, 32 placed on the main side 10 of each one of the connection elements $7, 9', 9'', 9^N$ and of one optical receiving means 28, 34 placed on an opposed main side 12 of each one of the connection elements $7, 9', 9'', \ldots, 9^N$. Moreover, each one of the transmitting 30, 32 and receiving 28, 34 means is adapted to cooperate for exchanging data with a respective receiving 28, 34 and transmitting 30, 32 means of another adjacent of the connection elements $7, 9', 9'', \ldots, 9^N$. According to another preferred embodiment shown in the Figures, the optically-connected system for exchanging data among industrial automation devices of the present invention also substantially comprises a plurality of connection elements $7, 9', 9'', \ldots, 9^N$, each one of said which is equipped with at least two pairs of optical transmitting 30, 32 and receiving 28, 34 means. Each pair is composed of one optical transmitting means 30, 32 placed on the main side 10 of each one of the connection elements $7, 9', 9'', \ldots, 9^N$ and of one optical receiving means 28, 34 placed on an opposed main side 12 of each one of the connection elements $7, 9', 9'', \ldots, 9^N$; moreover, in order to always guarantee the operating functionality of the connection elements $7, 9', 9'', \ldots, 9^N$ independently from the orientation with which they are assembled (for example on a DIN-type bar), each pair of optical transmitting 30, 32 and receiving 28, 34 means is further placed on the main sides 10, 12 of the connection elements $7, 9', 9'', \ldots, 9^N$ in an opposite way with respect to the previous pair in such a way as to place on each main side 10, 12 of the connection elements $7, 9', 9'', \ldots, 9^N$ one transmitting means 30, 32 followed by one receiving means 28, 34 (as can be better seen in FIG. 5), eventually followed by one transmitting means 30, 32 (not shown) and so on. Also in this case, each one of the transmitting 30, 32 and receiving 28, 34 means is adapted to cooperate for exchanging data with a respective receiving 28, 34 and transmitting 30, 32 means of another adjacent of the connection elements $7, 9', 9'', \ldots, 9^N$.

In order to allow installation and connection of a higher number of connection elements $7, 9', 9'', \ldots, 9^N$, according to application requirements, at least one of the connection elements $7, 9', 9'', \ldots, 9^N$ can further be equipped, on one of its minor sides 14 perpendicular to the sides 10, 12 on which the transmitting 30, 32 and receiving 28, 34 means are placed, with at least one further pair of transmitting 30, 32 and receiving 28, 34 means (not shown). In this case, two adjacent rows of connection elements 7, 9', 9", . . . , $9^N$ can be installed and data are transmitted and received not only along the two rows, but also between one row and the other, with an optical "perpendicular" connection between an element of a row and the corresponding element below in the other row.

As known, the connection elements 7, 9', 9", . . . , $9^N$ are placed inside respective boxes 13 for industrial automation in order to allow their use with the present invention; however, it is not necessary that such boxes 13 are of a particularly complicated and costly shape or configuration; instead, boxes 13 are chosen that are as inexpensive as possible. The boxes 13, like the one schematically shown in FIG. 2, are equipped with means 15 for the connection to bars (for example of the DIN type). In order to be able to use such boxes 13 with the present invention, it is enough to drill, in each one of them, holes 16, 18, 20, 22 obtained next to the transmitting 30, 32 and receiving 28, 34 means in order to allow their mutual operability. Obviously, the boxes 13 for the connection elements 7, 9', 9", . . . , $9^N$ adapted to also perform the "perpendicular" connection, will also have holes 24, 26 obtained next to the further pair of transmitting 30, 32 and receiving 28, 34 means being present on the side 14.

Preferably, the optical transmitting 30, 32 and receiving 28, 34 means are composed of transmitters and receivers of optical rays at infrared frequency, particularly, but not in a limiting way, operating according to the IrDa protocol.

With this type of optical components, an operating circuit can be realized, schematically shown in FIG. 7, which provides that each pair of transmitters 30, 32 and receivers 28, 34 is connected to a respective encoder/decoder 36, 38 in turn connected to control and management means 40, 42 (commonly a UART-type of card 40 and a microprocessor 42). Such control and management means 40, 42 are connected, through an I/O interface 44, to a terminal board 46 for supply and signal input/output from external industrial automation devices (not shown).

Alternatively, obviously, the optical transmitting 30, 32 and receiving 28, 34 means can be composed of transmitters and receivers of optical rays with laser rays, at microwave frequency, or other types of equivalent optical means, and even using visible light.

In order to complete the operating connections of the system of the invention, the supply to each one of the connection elements 7, 9', 9", . . . , $9^N$ can be provided separately with respect to the optically-connected system, for example by serial connections through small cables, or using detachable connection terminal boards, in order to facilitate supply disconnection and reconnection operations when replacing or maintaining the connection elements 7, 9', 9", . . . , $9^N$ and/or the boxes 13.

Further in a known way, as shown in FIG. 1, the connection elements 7, 9', 9", . . . , $9^N$ are composed of a plurality of data input and output elements 9', 9", . . . , $9^N$ respectively connected (through digital inputs or outputs 11', 11", . . . , $11^N$ that can be 2, 4, 8 and like numbers) to external industrial automation devices (not shown) and of a data collecting and queuing element 7 ("power terminal") operatively connected to the data input and output elements 9', 9", . . . , $9^N$: such element 7 is connected, through a field bus 3, to an upstream numeric control 1 for managing data.

With the above-described system it is therefore possible to obtain the following advantages:

1. If a module 9', 9", . . . , $9^N$ is removed, the system goes on operating.

2. If due to a connection error, during the installation phase, high voltage is provided to a module 9', 9", . . . , $9^N$, this one is damaged, but the other ones, being galvanically insulated, remain operating.

3. Not having the constraint of arranging the modules 9', 9", . . . , $9^N$ one beside the other, they can be separated in order to divide them logically depending on the type of treated signals or their functionality, with following simplifications for maintenance personnel and responsible operators.

In some current devices, such as, for example, U.S. Pat. No. 6,650,844 to Davies, a back plain is provided (as shown in FIG. 1 of the Davies Patent) in order to allow data exchange among the aligned boards. Contrarily, in the present invention the back plain is not necessary since it is entirely replaced by optical connections. Additionally, optical alignment among the boards in the back plain of the prior art is critical to allow communication between the boards thereby requiring the use of a locking mechanism for the boards to remain in precise alignment. Whereas, precise alignment among the boards in the present invention is not a determining factor, so the use of a locking mechanism is unnecessary.

Additionally, due to the structural differences between prior art and the present invention, even the operation of the two is deeply different. As can be seen, in FIG. 8, there is shown a schematic block diagram of a series of I/O modules. The modules operate as follows: first, a required (practically unlimited) number of board I/O modules is provided. The board I/O modules comprise a master module (M) and a termination module (T). Additional I/O modules ($B_1$, $B_2$, $B_3$, . . . ,$B_N$) can be placed side by side between the master module and the termination module according to an "Easy chain" configuration in order to allow an optical transmission of an interrogation signal ($I_S$) and a response signal ($R_S$) in two opposed directions. Next, the unit comprising the I/O boards is energized. Then, the master module M sends a first interrogation signal $I_S$ to the first following board $B_1$ requesting a module identification response (i.e. "which kind of module is it?"). Next, the board $B_1$ transmits a first response signal $R_S$ communicating the board's characteristics to the master module M which stores the information. Then, the board $B_1$ becomes a "passing" board for the following optical signals. Next, the master module M sends a second interrogation signal $I_S$ to the next board $B_2$ through the preceding board $B_1$ requesting a module identification response. Then, board $B_2$ replies with a second response signal $R_S$ that passes through the preceding board $B_1$ communicating its characteristics to the master module M. Then, the board $B_2$ becomes a "passing" board for the following optical signals. Next, the remaining boards $B_3$, . . . , $B_N$ are sequentially sent an interrogation signal $I_S$, as described above, until the master module M interrogates the terminator module T by passing the interrogation signal $I_S$ through all the preceding boards $B_1$, $B_2$, $B_3$, . . . , $B_N$. The terminator board T answers through the preceding boards $B_1$, $B_2$, $B_3$, . . . , $B_N$ by a response signal $R_S$ communicating to the master board M that the chain is terminated; in this way, immediately after the switching on of the chain, the master board M knows the entire configuration of the chain and, particularly, the characteristics of all the modules $B_1$, $B_2$, $B_3$, . . . , $B_N$ composing it. The terminator board T serves to indicate with precision to the master board M that the chain is terminated, otherwise the possible presence of a failed module along the chain which, for example, interrupts the transmission of optical signals through the chain itself, can make the master board M believe that the chain is shorter than what it really is. Consequently, the presence of the terminator board T makes the operations of the Applicant's board extremely reliable and transparent.

In another embodiment, there is provided an optically-connected system for exchanging data among industrial automation devices, the system comprising a plurality of connection modules. Each connection element has a main side and an opposing main side, and, perpendicular to the main sides, a minor side and an opposing minor side. Each one of the connection modules comprises at least two pairs of optical transmitters and receivers. Each pair of the optical transmitters and receivers comprises one optical transmitter on the main side of each one of the connection modules, and one optical receiver on the opposing main side of each one of the connection modules. Each pair of the optical transmitters and receivers is further placed on the main side of the connection modules in an opposite way with respect to another pair of the transmitters and receivers in a following connection element, in such a way as to place on each main side of the connection modules one transmitter followed by one receiver eventually followed by one transmitter. Each one of the transmitters and receivers is adapted to communicate with industrial automation devices. Each one of the transmitters and receivers is adapted to cooperate for exchanging data with a respective receiver and transmitter of another adjacent of the connection modules. Each one of the transmitters is adapted to send to each corresponding one of the receivers one interrogation signal requesting an identity of the receiver, and each one of the receivers is adapted to send to each corresponding requesting transmitter a Response signal containing characteristics of the receiver, the Response signal identifying each receiver as a receiver that passes information from a first one of the transmitters to a last one of the receivers, the Response signal of the last one of the receivers containing information identifying the last one of the receivers as an end receiver of the system. An optical beam transmitted through the system is a combination of a beam transmitted by each connection module and a beam received by a following connection module.

In another embodiment, at least one of the connection modules is equipped on one of its minor sides with at least one additional pair of transmitters and receivers. Each of the connection modules is placed inside a box for industrial automation, each one of the boxes being equipped with holes next to the transmitters and receivers in order to allow their mutual operability. In another embodiment, the connection modules are placed inside a box for industrial automation, each one of the boxes being equipped with holes obtained next to the transmitters and receivers in order to allow their mutual operability and with holes obtained next to the at least one additional pair of transmitters and receivers in order to allow their operability.

In another embodiment, the optical transmitters and receivers transmit and receive infrared rays, or operate according to the IrDa protocol. Each pair of the transmitters and receivers is connected to a respective encoder/decoder, that is in turn connected to a control and management device. The control and management device is connected, through an I/O interface, to a terminal board for supply and signal input/output from one or more than one external industrial automation device. Optionally, the control and management device is composed of a UART-type element and a microprocessor. Each path of the transmitters and receivers is connected to a respective encoder/decoder, that is in turn connected to a control and management device. In another embodiment, the control and management device is connected, through an I/O interface, to a terminal board for supply and signal input/output from one or more than one external industrial automation device.

In another embodiment, the control and management device is composed of a UART-type element and a microprocessor.

In another embodiment, the optical transmitters and receivers transmit and receive laser rays.

In another embodiment, the optical transmitters and receivers transmit and receive microwave rays.

In another embodiment, the optical transmitters and receivers transmit and receive rays in the visible spectrum.

In another embodiment, the supply is provided by serial connections through small cables.

In another embodiment, the supply is provided by detachable connection terminal boards.

In another embodiment, the optically-connected system further comprises a supply to each one of the connection modules that is separate from the optically-connected system.

In another embodiment, the supply is provided by serial connections through small cables.

In another embodiment, the supply is provided by detachable connection terminal boards.

In another embodiment, the connection modules further comprise a plurality of data input and output elements respectively connected to industrial automation devices. The connection modules further comprise a data collecting and queuing element operatively connected to the data input and output elements, the element being connected, through a field bus, to a numeric control for managing data.

In another embodiment, there is provided a method for exchanging data among industrial automation devices comprising: a) providing a system according to claim 1; and b) starting transmission and reception of data among the industrial automation devices. Each of the industrial automation devices is connected to one of the connection modules.

Although the present invention has been discussed in considerable detail with reference to certain preferred embodiments, other embodiments are possible. Therefore, the scope of the appended claims should not be limited to the description of preferred embodiments contained in this disclosure. Additionally, although specific means and configurations have been described, it will be appreciated that modifications may be made to such means and configurations while still remaining within the scope of the appended claims.

The invention claimed is:

1. An optically-connected system for exchanging data among one or more than one industrial automation device, the system comprising a plurality of galvanically insulated connection modules;

where each connection module has a main side and an opposing main side, and, perpendicular to the main sides, a minor side and an opposing minor side;

where each one of the connection modules comprises at least two pairs of optical transmitters and receivers;

where each pair of the optical transmitters and receivers comprises one optical transmitter on the main side of each one of the connection modules, and one optical receiver on the opposing main side of each one of the connection modules;

where each pair of the optical transmitters and receivers is further placed on the main side of the connection modules in an opposite way with respect to another pair of the transmitters and receivers in a following connection element, in such a way as to place on each main side of the connection modules one transmitter followed by one receiver eventually followed by one transmitter;

where each one of the transmitters and receivers is adapted to communicate with the one or more than one industrial automation device;

where each one of the transmitters and receivers is adapted to cooperate for exchanging data with a respective receiver and transmitter of an adjacent connection module;

where each one of the transmitters is adapted to send to each corresponding one of the receivers one interrogation signal requesting an identity of the receiver, and each one of the receivers is adapted to send to each corresponding requesting transmitter a response signal containing characteristics of the receiver, the response signal identifying each receiver as a receiver that passes information from a first one of the transmitters to a last one of the receivers, the response signal of the last one of the receivers containing information identifying the last one of the receivers as an end receiver of the system;

where an optical beam transmitted through the system is a combination of a beam transmitted by each connection module and a beam received by a following connection module;

where each of the connection modules is placed inside a box for industrial automation, each one of the boxes being equipped with holes next to the transmitters and receivers in order to allow their mutual operability;

where the optical transmitters and receivers transmit and receive infrared rays at a single frequency;

where the transmitters and receivers operate according to the IrDa protocol;

where each pair of the transmitters and receivers is connected to a respective encoder/decoder, that is in turn connected to a control and management device;

where the control and management device is connected, through an I/O interface, to a terminal board for supply and signal input/output from the one or more than one industrial automation device;

where the control and management device is composed of a UART-type element and a microprocessor;

where the connection modules further comprise a plurality of data input and output elements respectively connected to one or more than one industrial automation device; and where the connection modules further comprise a data collecting and queuing element operatively connected to the data input and output elements, the element being connected, through a field bus, to a numeric control for managing data.

* * * * *